United States Patent

Scott et al.

[11] Patent Number: 5,913,720
[45] Date of Patent: Jun. 22, 1999

[54] METHOD AND APPARATUS FOR PREPARING AN ACCESS SLIT IN THE NECK OF A POULTRY CARCASS

[75] Inventors: Norman K. Scott, Raymore; Lincoln S. Langhorn, Kansas City, both of Mo.; Rudolf J. Tieleman, Kansas City, Kans.

[73] Assignee: Johnson Food Equipment, Inc., Kansas City, Kans.

[21] Appl. No.: 08/792,928

[22] Filed: Jan. 21, 1997

[51] Int. Cl.$^6$ .................................................. A22C 21/06
[52] U.S. Cl. .............................. 452/120; 452/168; 452/63
[58] Field of Search ............................... 452/120, 63, 168

[56] References Cited

U.S. PATENT DOCUMENTS

| | | |
|---|---|---|
| 2,828,506 | 4/1958 | O'Donnell . |
| 3,056,161 | 10/1962 | Zebarth . |
| 3,165,780 | 1/1965 | Kellersman et al. . |
| 3,668,738 | 6/1972 | Vertegaal . |
| 3,802,028 | 4/1974 | Scheier et al. . |
| 3,958,303 | 5/1976 | Scheier et al. . |
| 4,136,421 | 1/1979 | Scheier et al. . |
| 4,184,230 | 1/1980 | Fox et al. ................................. 452/120 |
| 4,249,285 | 2/1981 | Sheehan et al. ........................ 452/63 |
| 4,257,142 | 3/1981 | Hathorn et al. . |
| 4,265,001 | 5/1981 | Hathorn et al. . |
| 4,266,322 | 5/1981 | van Mil . |
| 4,418,444 | 12/1983 | Meyn et al. ............................. 452/168 |
| 4,467,500 | 8/1984 | Olson ...................................... 452/120 |
| 4,550,473 | 11/1985 | Simmons ................................ 452/168 |
| 4,730,365 | 3/1988 | Simmons ................................ 452/168 |
| 4,894,885 | 1/1990 | Markert .................................. 452/63 |
| 5,569,072 | 10/1996 | Tieleman et al. . |

FOREIGN PATENT DOCUMENTS

| | | |
|---|---|---|
| 0258480 | 4/1986 | European Pat. Off. . |
| 258480 | 3/1988 | European Pat. Off. ............... 452/168 |
| 9700466 | 8/1997 | WIPO . |

OTHER PUBLICATIONS

Meyn Turkey & Duck Processing Brochure Entitled "Neck-skin Slitter for Turkeys—Type NST" (Publication Date to be Jun., 1991).

Meyn Turkey & Duck Processing Brochure Entitled "Meyn Turkey & Duck Processing Flash" (Publishing Date Unknown).

*Primary Examiner*—Willis Little
*Attorney, Agent, or Firm*—Hovey, Williams, Timmons & Collins

[57] ABSTRACT

Poultry carcasses hanging by their legs from a moving overhead conveying line are presented to corresponding carcass processing fixtures moving in a closed loop of travel around an upright axis. As each carcass is presented to its fixture, a holder on the fixture takes control of the carcass and stabilizes it with the breast facing outwardly and the neck hanging downwardly against a sloped centering channel. Once the carcass is stabilized, an arm carrying a slitting knife swings up toward the front throat area of the neck but before the knife can contact the neck skin, a stretcher device mounted in close proximity to the knife but operable in a stretching motion relative to the knife engages the skin and pulls it downwardly into a taut condition to facilitate penetration and severance by the knife. The stretcher is operated in its stretching motion by camming engagement with the underside of a shoulder yoke on the holder as the arm presents the knife to the carcass.

31 Claims, 5 Drawing Sheets

METHOD AND APPARATUS FOR PREPARING AN ACCESS SLIT IN THE NECK OF A POULTRY CARCASS

TECHNICAL FIELD

This invention relates to poultry processing equipment and, more particularly, to a machine and method for preparing a relatively small access slit in the neck skin of a poultry carcass while the carcass is on the move and suspended from an overhead conveying line. The neck slit is prepared just prior to evisceration of the carcass to provide an access opening for admitting a suitable tool that is used to loosen the crop of the carcass in preparation for removal of the crop intact with the rest of the organ package during evisceration, such tool taking the form, for example of that illustrated in co-pending application Ser. No. 08/589,114 filed Jan. 19, 1996 and owned by the assignee of the present invention.

BACKGROUND

In carrying out the crop loosening procedure pursuant to the above-mentioned application, a relatively small, hook-shaped tool is inserted up into the neck of the carcass to loosen and dislodge the crop from tissues within the neck before the crop and the rest of the organs of the alimentary tract are then removed as a complete package through an opening at the posterior of the carcass. It has been determined that, for best results, the tool should be inserted into the side of the neck through a longitudinal slit in the skin. The tracheae and esophagus housed within the neck chamber should not be severed or damaged.

Heretofore, others have attempted to prepare the slit using a knife blade that swings into engagement with the neck skin and then moves in a longitudinal slitting stroke away from the shoulders of the carcass generally parallel with the neck axis. A positioning yoke situated immediately below the knife blade and moveable with the blade engages the neck immediately before the knife blade and in leading relationship to the blade as the slitting stroke is carried out so as to keep the neck properly located with respect to the blade.

However, it has been found that, particularly because the heads of the carcasses have already been removed by this stage of the processing operation, the neck skin has a tendency to shrivel and retract up along the underlying stump of the neck, making it difficult to accurately and effectively carry out the slitting operation.

SUMMARY OF THE PRESENT INVENTION

Accordingly, an important object of the present invention is to provide a slitting method and apparatus effective to produce a properly dimensioned and precisely located slit in spite of the tendency of the neck skin to shrivel and bunch up following removal of the head. In this regard, an important object of the invention is to provide a way of pulling or stretching the neck skin into a more taut condition immediately prior to and during severance by the knife so that the skin is in proper condition for being cut in an effective and precise manner.

In carrying out the foregoing, the present invention contemplates the use of a stretching device located in close proximity to the knife blade and moveable with the blade as it approaches the neck of the carcass for severance. However, the stretcher is disposed to engage the neck first and is mounted for movement relative to the knife so that, as the common carrier for the knife and the stretcher moves through its operating cycle, the stretcher engages both the skin and stationary cam structure on the carcass holder to pull or stretch the skin downwardly before the knife contacts the skin. This causes the neck skin to become relatively taut so that as the knife then contacts the prepared skin, the knife can readily penetrate the skin in the exactly proper location and can cleanly slice axially along the neck in a slitting stroke that is repeatable and predictable from carcass to carcass. Moving the stretcher through its own short stroke relative to the knife while contacting the neck skin just before the knife performs its cutting task solves the problems experienced in prior constructions.

DETAILED DESCRIPTION

Figure 1:
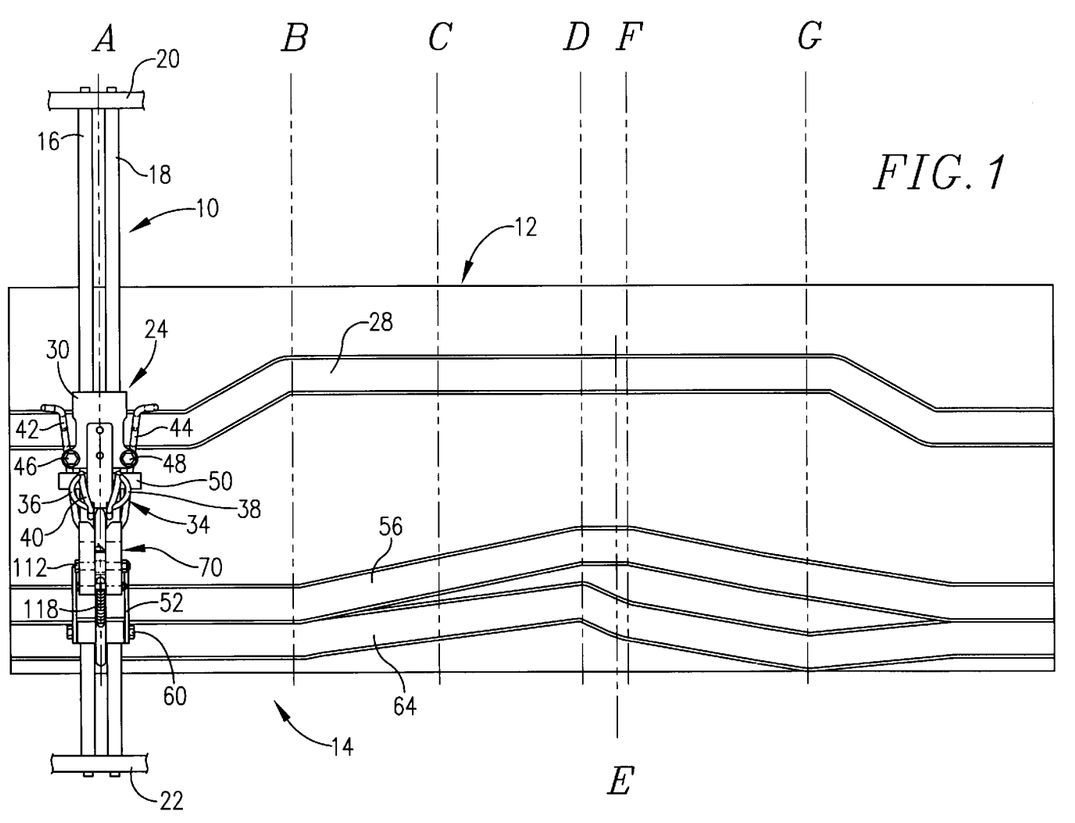
FIG. 1 is a front elevational view of a single fixture and flat cam track assembly for operating various moveable parts of the fixture, capable of carrying out the principles of the present invention, although in commercial form the cam track assembly would be cylindrical or conical to form a closed loop and a series of the fixtures would be present.

FIG. 1 shows a fixture 10 and a flat cam assembly 12 of a processing machine broadly denoted by the numeral 14. For ease of understanding, only a single fixture 10 has been illustrated and will be described herein, although as well understood by those of ordinary skill in the art, a commercial version of the machine incorporating the principles of the present invention would have a series of the fixtures 10 moving in a closed loop of travel around an upright axis. Similarly, although the cam assembly 12 of the machine 14 has been illustrated in a flat condition, such is for illustrative purposes only, and a commercial version of the machine would have the cam assembly arranged in a closed loop adjacent that of the fixtures.

The fixture 10 is desirably similar to the fixture disclosed in U.S. Pat. No. 5,569,072 issued Oct. 29, 1996 and titled "Poultry Processing Mechanism Having Carcass Stabilizer." Accordingly, the '072 patent is hereby incorporated by reference into the present specification.

Fixture 10 includes a pair of upright, parallel rods 16 and 18 that extend between and are fixed to upper and lower members 20 and 22 respectively. Members 20,22 are fixed to rotating parts of the machine so that the fixture 10 rotates as well about the central axis of the machine.

Fixture 10 also includes a carcass holder 24 that is vertically shiftable along the rods 16,18 as determined by a follower 26 projecting from the rear of the holder 24 and riding within a cam track 28 of the cam assembly 12. Holder 24 includes a block 30 preferably constructed of a synthetic material commonly referred to as "PET-P", as well as a metal backstop 32 that projects outwardly and downwardly at an angle from the block 30. The backstop 32 is so disposed that the backbone of the carcass lies flatly up against the backstop 32 during processing operations to thereby stabilize the carcass and properly locate critical portions thereof for the application of processing operations.

The holder 24 also includes a shoulder yoke 34 projecting outwardly and upwardly from the backstop 32 generally adjacent the lower end thereof. The yoke 34 is disposed to receive the neck of the carcass as illustrated in FIGS. 7–14 and to bear up against the shoulders of the carcass on opposite sides of the neck. The yoke 34 includes a pair of laterally spaced apart, left and right cradles 36 and 38 respectively for receiving corresponding shoulders of the carcass, each cradle 36,38 having an outwardly and upwardly curved rod 40 whose arcuate lower surface serves as part of cam structure for operating the neck skin stretcher of the present invention as hereinafter described in more detail. As illustrated particularly in FIG. 14, the two rods 40 of the left and right cradles 36,38 diverge outwardly and upwardly away from the backstop 32 so as to facilitate entry and exit of the neck of the carcass during loading and unloading of the carcass on the fixture 10.

The block 30 of the holder 24 carries a pair of hip stabilizer arms 42 and 44 that pivot laterally about respective fore-and-aft pivots 46 and 48. The stabilizer arms 42 and 44 are designed to coact with a stationary, transverse cam bar 50 fixed to the upright guide rods 16,18 below the block 30 so that, as the block 30 rises and falls on the rods 16,18, the stabilizer arms 42,44 swing in and out about the pivots 46,48 to the extent determined by the interaction of the lower ends of the stabilizer arms and the cam bar 50. As illustrated in FIGS. 7–14, the upper ends of the stabilizer arms 42,44 undergird the hips of the carcass and clamp against opposite sides of the trunk of the carcass during the processing operation.

Fixture 10 further includes a slide block 52 carried on the guide rods 16,18 below the carcass holder 24. The vertical disposition of the slide block 52 along the guide rods 16,18 is determined by a follower 54 projecting from the back of the slide block 52 and received within a cam track 56. The slide block 52 pivotally supports a generally J-shaped carrier arm 58 via a pivot bolt 60 at the lower front corner of the slide block 52, the carrier arm 58 being supported intermediate its two opposite ends by the pivot 60. At its inner or lower end, the carrier arm 58 has a follower 62 which is received within another track 64 of the cam assembly 12. The carrier arm 58 is thus caused to swing up and down about the pivot 60 to the extent determined by the follower 62 within the track 64.

Figures 3, 4, 5, 6:
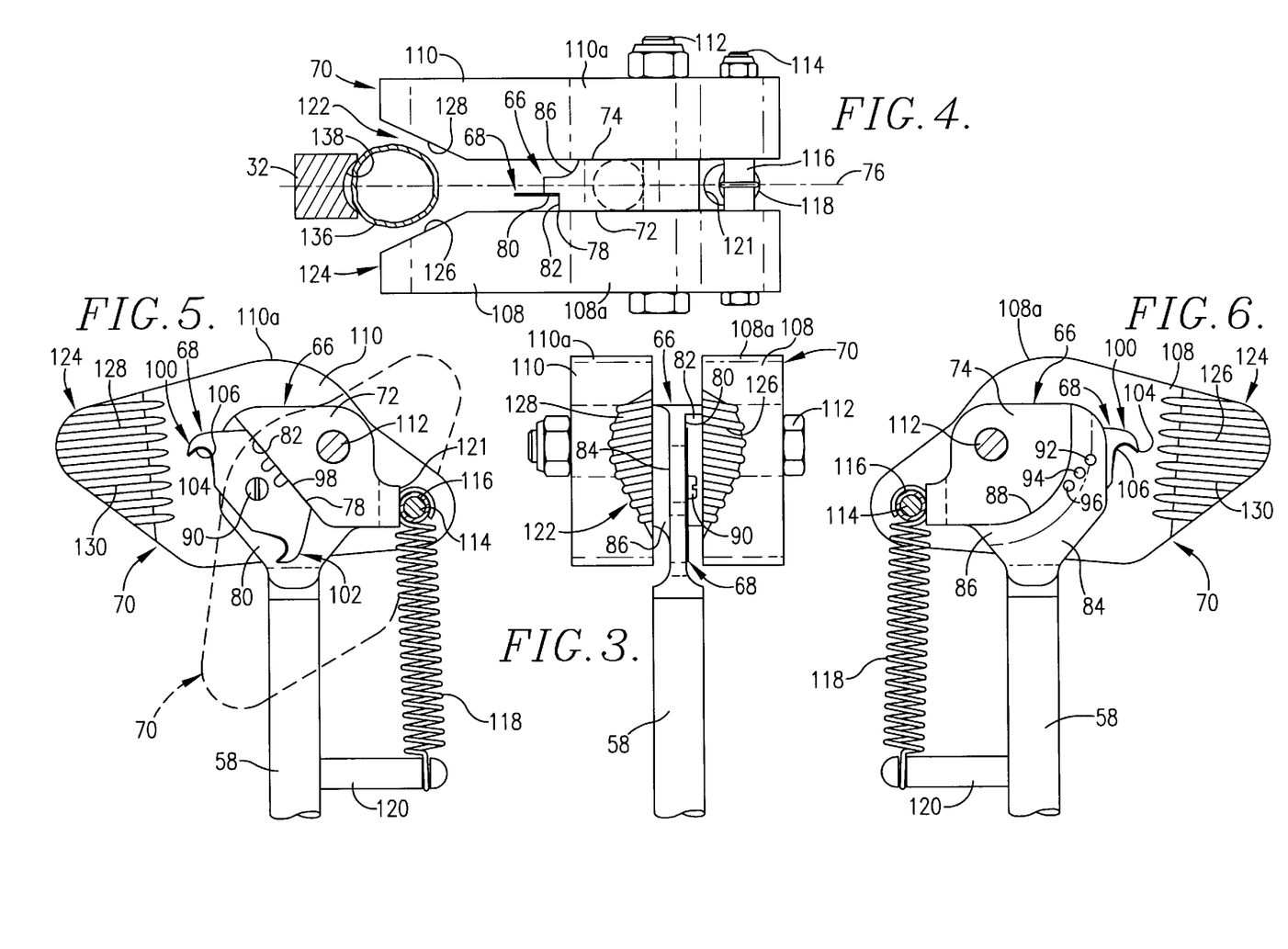
FIG. 3 is an enlarged, fragmentary elevational view of the neck skin stretcher and knife at the outer end of the carrier arm of the fixture.
FIG. 4 is a top plan view thereof, along with a cross-sectional illustration of the neck of a carcass to be slit.
FIG. 5 is an enlarged, fragmentary side elevational view of the stretcher and knife at the outer end of the carrier arm, with the near half-section of the stretcher removed for clarity.
FIG. 6 is an opposite side elevational view of the stretcher and knife with the other half-section of the stretcher removed for clarity.

The outer, upper end of the carrier arm 58 has a specially configured head 66 (FIG. 5) that supports both a knife 68 and a neck skin stretcher or stretching device 70. The head 66 is rigidly affixed to the carrier arm 58. The head 66 has a pair of opposite flat faces 72 and 74 which are spaced equally from an imaginary center line 76 (FIG. 4) passing through the head 66 in the same vertical plane as the central longitudinal axis of the carcass when mounted on the fixture 10. The face 72 (FIG. 5) terminates inwardly at a diagonal edge 78. At that location a recessed floor 80 extends in parallelism with the face 72 to the opposite extremity of the head 66. As illustrated in FIG. 4, the recessed floor 80 is slightly laterally offset from the center line 76. A diagonally extending abutment shoulder 82 extends outwardly from the floor 80 at right angles thereto and intersects with the edge 78. The opposite side of the head 66 also has a recessed floor 84 (FIG. 6), but the floor 84 is joined with its corresponding flat face 74 by an arcuately concave fillet 86 which leads outwardly to a convexly curved inner edge 88 of the face 74.

As shown in FIG. 5, the knife 68 is fixed to the floor 80 on one side of the head 66 by a screw 90. As illustrated in FIG. 6, the screw 90 may be threaded into any selected one of three internally threaded receiving holes 92, 94 and 96 so as to permit adjustment of the extent to which the knife 68 projects beyond the head 66. The knife 68 comprises a flat blade which is generally trapezoidal when viewed in plan. One face of the knife blade 68 lies flatly up against the recessed floor 80, while the flat top edge 98 of the knife blade butts up against the abutment shoulder 82 to prevent rotation of the knife about the fastening screw 90. The knife has a pair of identical, downturned slitting hooks 100 and 102 at its two outer corners which, because of their identity, permit the knife 68 to be detached from the head 66 when one hook becomes dull and turned over to expose the other, sharpened hook for use. Each hook 100,102 has a sharp point 104 and a concave cutting edge 106 leading away from the point 104 on the underside of the hook.

It has been found that the knife 68 may take the form of a standard, commercially available, hook-style utility blade such as Wiss No. RWK-13V available from Cooper Tools of Apex, N.C. However, the Wiss blade is not a stainless steel blade, and it is believed that better performance can be obtained with a blade fabricated from stainless steel. Therefore, to maintain a cutting edge for a longer duration and to promote sanitation, it may be necessary to fabricate the knife 68 from stainless steel.

The stretcher 70 is pivotally mounted on the head 66 so that while it is presented to the carcass along with the knife 68 by the carrier arm 58, it can also move relative to the knife 68 in a neck skin stretching motion. In this respect, the stretcher 70 comprises a pair of somewhat elliptical-shaped half segments 108 and 110 (FIGS. 3–6), preferably constructed of Nylon material, which are disposed on opposite sides of the head 66. The inner surfaces of the segments 108,110 bear against and slide along the respective opposite faces 72 and 74 of the head 66, and the segments 108,110 are pivotally mounted on the head 66 by a transverse pivot bolt 112. Pivot bolt 112 also clamps the two segments 108,110 together, augmented by a rear clamping bolt 114 extending between and passing through the segments 108,110 at a position rearwardly of the pivot axis defined by bolt 112. A spacer 116 surrounds the clamp bolt 114 between the rear ends of segments 108,110 to maintain the appropriate spacing between the segments at that location.

A helical tension spring 118 is hooked at its upper end to the spacer 116 and at its lower end to an anchor pin 120 rigidly affixed to and projecting outwardly from the carrier arm 58. Consequently, the spring 118 yieldably biases the stretcher 70 toward its non-operated, standby position illustrated in solid lines in FIGS. 5 and 6. Rotation of the stretcher 70 about the pivot 112 in a clockwise direction viewing FIG. 5 is limited by engagement of the spacer 116 with a projecting abutment 121 on the head 66. As illustrated in phantom lines in FIG. 5, the stretcher 70 may be rotated in a counterclockwise direction to an operated position. When the stretcher 70 is in its standby position, the hook 100 of the knife 68 is protectively covered by the segments 108 and 110, but when the stretcher 70 is in its operated position, and for some degree of travel prior to reaching such fully operated position, the hook 100 is exposed.

The stretcher 70 is provided with a tapered receiving notch 122 at the working end thereof, which working end for convenience will hereinafter be referred to as the "nose 124" (FIG. 5) of the stretcher. The notch 122 in the nose 124 is formed by opposed, mutually converging bevels 126 and 128 on the inner surfaces of the segments 108,110 in the area of the nose 124. The bevels 126 and 128 are roughened such as by a series of transverse, shallow grooves 130 to promote frictional gripping of the neck skin of the carcass during operation.

The segments 108 and 110 have upper external edge surfaces 108a and 110a (FIGS. 3–6) in the area of the "nose" 124 and rearwardly therefrom along the top extremity of the stretcher 70 that serve as cam surfaces or cam structure during the skin stretching action of the stretcher 70. In this respect, the segments 108 and 110 are aligned laterally with the rods 40 of the shoulder cradles 36 and 38 so that, as the carrier arm 58 swings into operation, the nose 124 and edge surfaces 108a ,110a come into operating contact with the rods 40. Consequently, the rods 40 cam the stretcher 70 through a stretching stroke or motion in response to swinging of the carrier arm 58 upwardly through an operating cycle.

OPERATION

FIGS. 7 through 14 illustrate the use and operation of the present invention.

In those figures, a poultry carcass 132 is shown suspended by its legs from a shackle 134 forming part of an overhead conveying line that moves the carcasses in spaced succession through the processing plant. The conveying line and the processing machine 14 are disposed such that the paths of travel of the carcasses 132 and the fixtures 10 intersect one another at the machine 14. As the fixtures 10 of the machine 14 move in their closed loop of travel, each fixture becomes matched up with one of the carcasses on the conveying line until the slitting operation is completed, at which time the conveying line and the carcasses diverge from the machine 14 and move on to the next processing station.

It will be understood that while only a single processing function has been illustrated as taking place on the machine 14, in the commercial version one or more additional processing operations might be simultaneously performed on each carcass once it has been securely located and stabilized on a fixture. For example, in addition to the neck slitting operation occurring at the head end of the carcass pursuant to the present invention, a body cavity opening operation might be occurring at the posterior end of the carcass in accordance, for example, with the principles disclosed and claimed in concurrently filed, copending application Ser. No. 08/792,928 titled "Method and Apparatus for Making a Contoured Opening Cut in a Poultry Carcass" and assigned to the assignee of the present invention.

Figure 2:
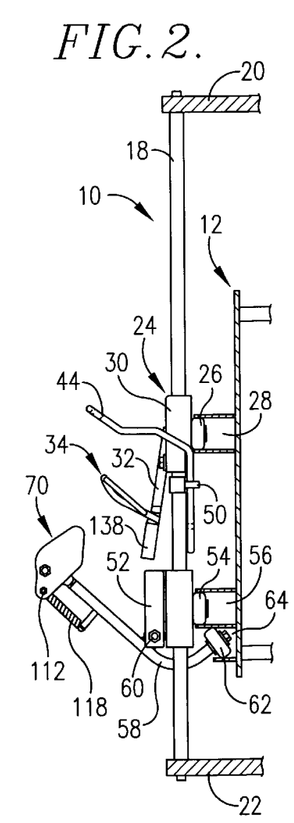
FIG. 2 is a left side elevational view of the fixture and flat cam assembly of FIG. 1 with parts shown in cross-section for clarity.
Figure 7:
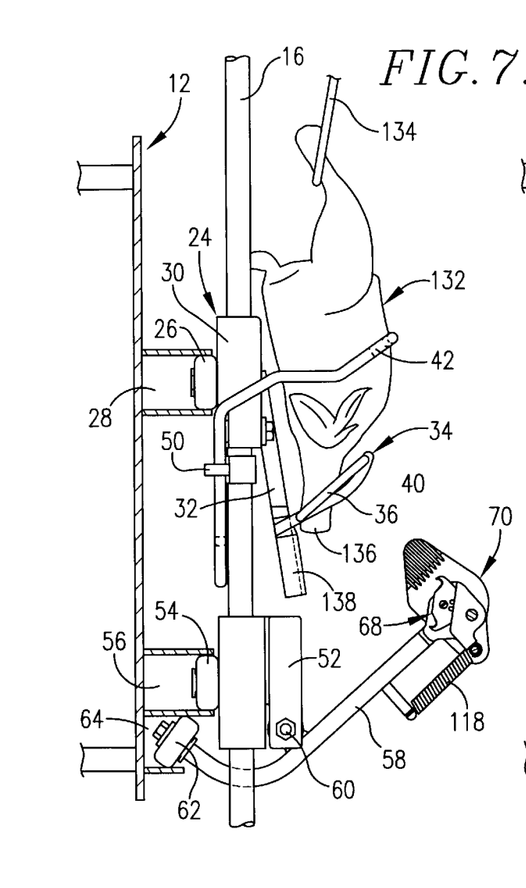
FIG. 7 is an enlarged, fragmentary side elevational view of the fixture and cam track assembly in the condition corresponding to position A in FIG. 1 and with a carcass loaded onto the fixture.

In FIG. 7 the carcass 132 is shown as it is being received within the holder 24. The condition of the fixture 10 corresponds to that shown in FIGS. 1 and 2 where the fixture 10 is at position A in its path of travel along the cam assembly 12. The knife 68 and the stretcher 70 are swung away from the holder 24 in a standby condition at this time. The stretcher 70 is maintained by the spring 118 in its standby position bearing against the stop 121.

Figure 8:
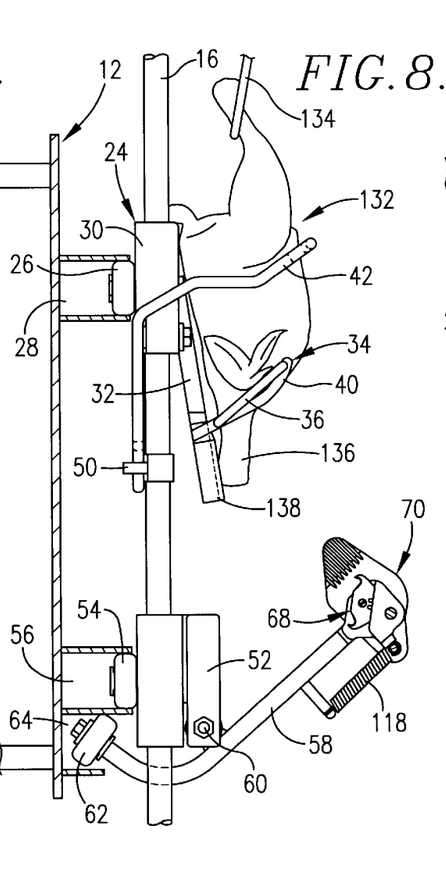
FIG. 8 is a side elevational view similar to FIG. 7 but with the fixture in position B of FIG. 1.

As the fixture 10 moves from position A to position B in FIG. 1, the upper cam track 28 rises, while the two lower cam tracks 56 and 64 remain level. Thus, as shown in FIG. 8, while the knife 68 and stretcher 70 remain in their standby position, the holder 24 progressively rises on the guide rods 16, 18. This causes the shoulder yoke 34 to come up against the shoulders of the carcass and to slightly lift the carcass as the neck of the carcass projects down through the gap between the two opposite cradles 36, 38 of the yoke 34. Simultaneously, the hip stabilizer arms 42 and 44 are cammed inwardly to firmly embrace the trunk of the carcass and to bear snugly up against the hips of the carcass immediately below the legs. This action thus has the effect of firmly locating, holding and stabilizing the carcass for the neck slitting operation.

Figure 9:
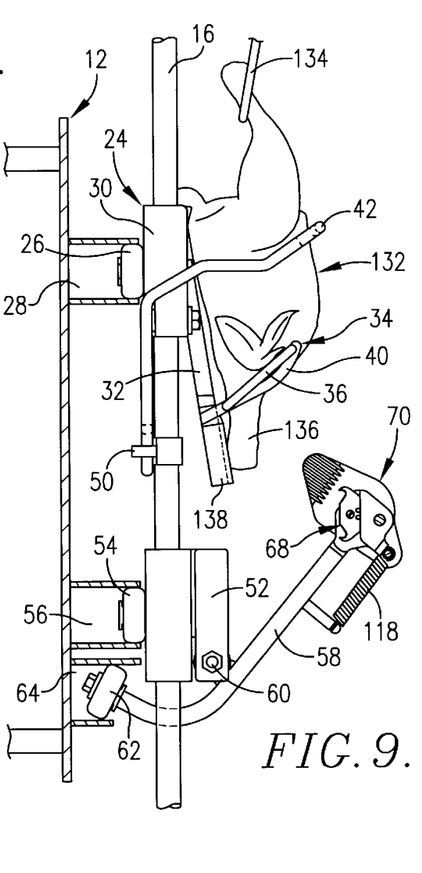
FIG. 9 is a side elevational view similar to FIG. 7 but showing the fixture in position C of FIG. 1.

As the fixture 10 moves from position B to position C in FIG. 1, the upper cam track 28 remains flat, while the two lower cam tracks 56 and 64 climb upwardly, the angle of ascent of the track 56 being slightly steeper than that of the track 64. Thus, as illustrated in FIG. 9, the carcass remains stabilized while the knife 68 and stretcher 70 swing toward the carcass as a result of the carrier arm 58 starting its operating stroke.

As the fixture 10 moves from position C to position D in FIG. 1, the upper track 28 remains flat, while the two lower tracks 56 and 64 continue their respective climbs. Thus, the carrier arm 58 continues to swing upwardly and to shift its pivot point 60 further up toward the carcass, all of which causes the knife 68 and stretcher 70 to approach the neck of the carcass as illustrated in FIG. 10.

As the fixture 10 moves from position D to position E in FIG. 1, the two upper tracks 28 and 56 remain flat, while the lower track 64 descends. Thus, the pivot point 60 of the carrier arm 58 stays at the same height as in FIG. 10, but the descending lower track 64 causes the arm 58 to swing abruptly inwardly at its upper end, thus causing the stretcher 70 to come into contacting engagement with the neck 136 of the carcass in FIGS. 11 and 11A. As shown in FIG. 4, the neck 136 lies in a concave centering channel 138 of the backstop 32 which projects downwardly at an angle from the holder block 30. Since the center line 76 of the stretcher 70 is in the same plane as the central longitudinal axis of the centering channel 138, when the neck 136 is properly centered within the channel 138, it is also properly centered with respect to the stretcher 70.

Figures 11, 11A:
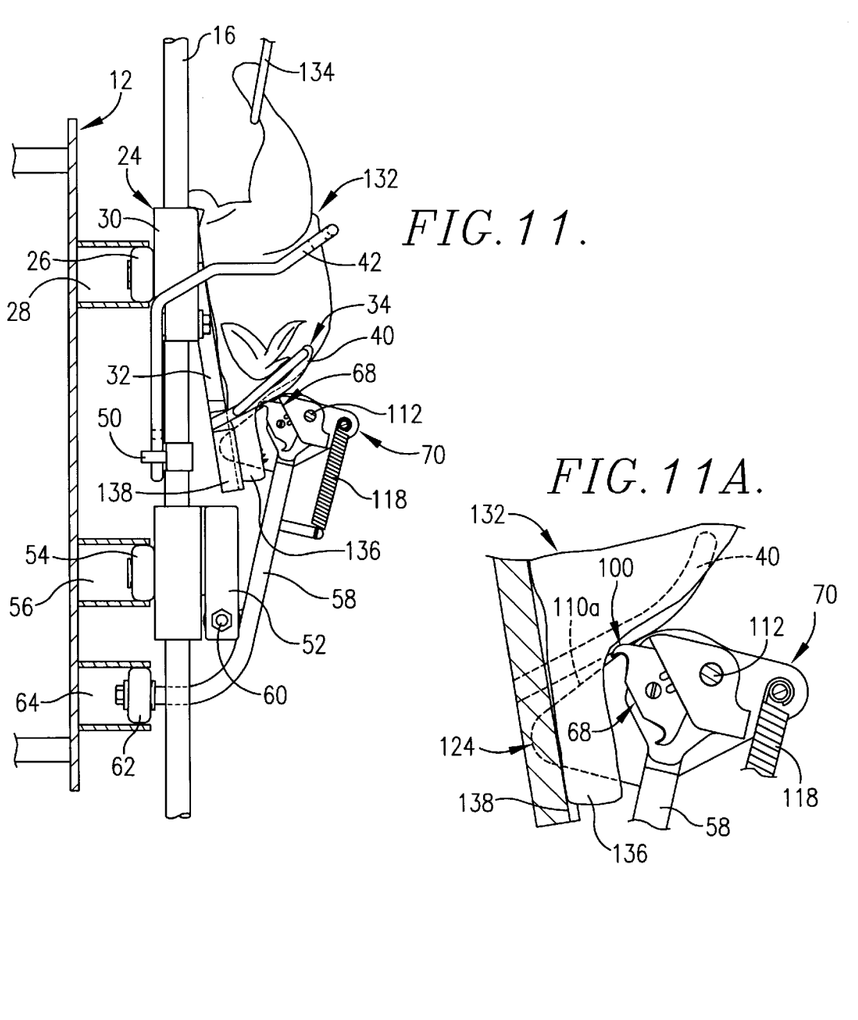
FIG. 11 is a side elevational view similar to FIG. 7 but showing the fixture in position E of FIG. 1.
FIG. 11A is a close-up view of the neck area, knife and stretcher illustrated in 11.

Consequently, as the nose 124 of the stretcher 70 approaches the neck 136 in FIG. 11 and FIG. 11A, the two segments 108 and 110 of stretcher 70 straddle the neck and guide the neck into the notch 122. Once within the notch 122, the neck comes into contact with the beveled surfaces 126 and 128 of the notch so that the stretcher 70 can then be effective in pulling the neck skin downwardly into a taut condition as the process continues.

Figure 10:
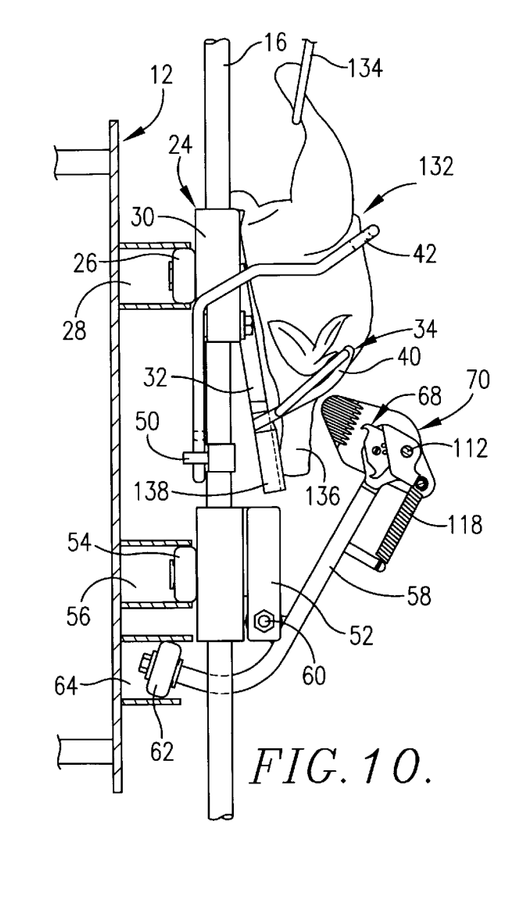
FIG. 10 is a side elevational view similar to FIG. 7 but showing the fixture in position D of FIG. 1.

It is important to note at this stage that as the carrier arm 58 swings from its FIG. 10 position to its FIG. 11 position, the nose 124 comes into operating engagement with the two upwardly curved rods 40 of the shoulder cradles 36, 38. Consequently, continued counterclockwise swinging of the carrier arm 58 results in the stretcher 70 being rocked about the pivot bolt 112 in a counterclockwise direction viewing FIGS. 10, 11 and 11A as the upper edges 108a and 110a contact and slide along the rods 40.

This action has two consequences. First, it causes the notched nose of the stretcher 70 to engage the neck skin to center the neck in the channel 138 and pull the loose skin downwardly along the underlying tissues of the neck. This causes the neck skin to become relatively taut and straightens out and lengthens any skin that may be bunched up near the shoulders.

Second, this action retracts the upper extremity of the stretcher down below the hook 100 of the knife 68, thus exposing the knife 68 for contact with the neck skin. This condition is illustrated in an enlarged view in FIG. 11A, where the hook 100 is just ready to engage and penetrate the neck skin immediately below the shoulders.

Figures 12, 12A, 13:
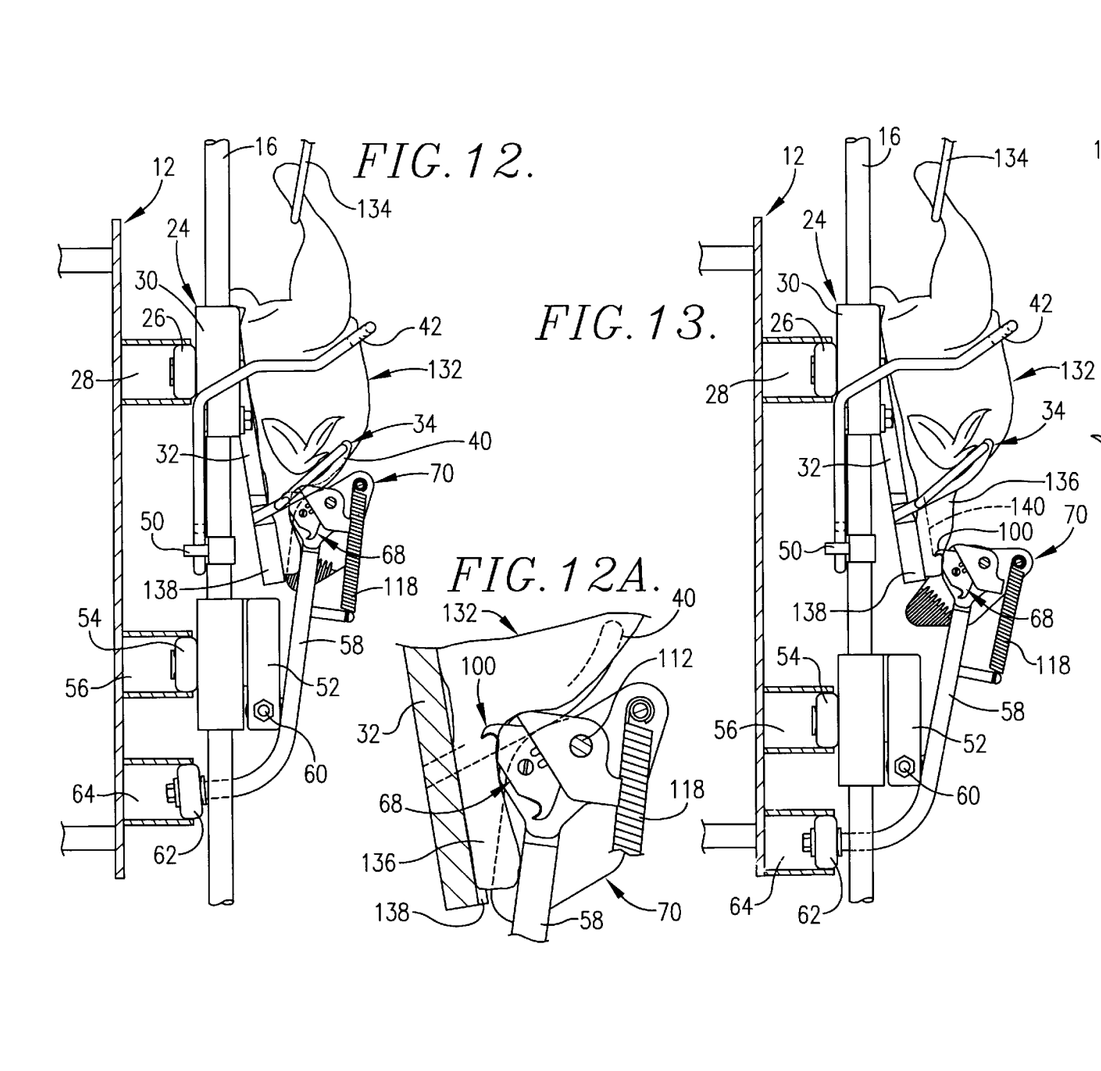
FIG. 12 is a side elevational view similar to FIG. 7 but showing the fixture in position F of FIG. 1.
FIG. 12A is a close-up view of the neck area, knife and stretcher illustrated in FIG. 12.
FIG. 13 is a side elevational view similar to FIG. 7 but showing the fixture in position G of FIG. 1.

As the fixture 10 travels from position E to position F in FIG. 1, the two upper tracks 28 and 56 remain flat, while the lower track 64 continues its descent. Thus, as illustrated in FIGS. 12 and 12A, the stretcher 70 continues to be cammed counterclockwise to stretch and wipe along the neck skin, while the knife hook 100 punctures the skin at the base of the neck and enters a short distance into the neck cavity. As will be noted in FIG. 4, however, because the knife hook 100 is offset slightly to the left of the center of the neck, the hook 100 misses the tracheae and the esophagus, which are typically located to the right side of the neck center.

As the fixture 10 then travels from position F to position G in FIG. 1, the upper track 28 stays flat while the two lower tracks 56 and 64 descend at substantially the same rate. This causes the carrier arm 58 to pull essentially straight down on the knife 68 in a direction parallel to the backstop 32 such that, as illustrated in FIG. 13, the knife hook 100 cuts a longitudinal slit 140 in the neck skin. Although the nose 124 of the stretcher 70 moves down off the neck during the slitting stroke, it remains in engagement with the backstop 32 so as to stay rotated sufficiently that the knife hook 100 remains exposed.

Figure 14:
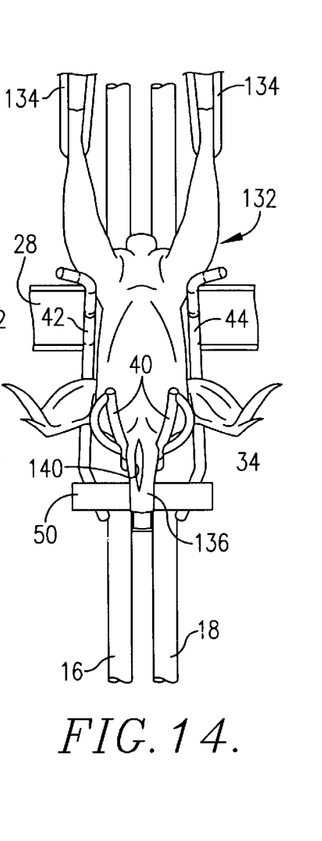
FIG. 14 is a fragmentary, front elevational view of the finished carcass after slitting, but with the knife, stretcher and carrier arm removed for clarity.

As the fixture 10 moves on past position G in FIG. 1, the upper track 28 descends, the middle track 56 continues its descent at the same rate as before, and the lower track 64 starts a gradual ascent. This has the effect of swinging the carrier arm 58 in a clockwise direction out away from the carcass, withdrawing the knife hook 100 from the neck skin and allowing the tension spring 118 to flip the stretcher 70 back to its standby position covering the knife 68. Also, the holder 24 moves down away from and releases the carcass so that the conveyor line may then depart from the machine 14 and transport the carcass to the next processing station. Consequently, the finished product appears as shown in FIG. 14.

We claim:

1. Mechanism for preparing an access slit in the neck skin along the breast side of the neck of a poultry carcass comprising:

a knife;

a device for engaging and pulling the neck skin taut along the breast side of the neck of the poultry carcass prior to slitting; and means for operating the knife in a manner to slit the neck skin along the breast side of the neck while it is pulled taut by the device.

2. Mechanism as claimed in claim 1, said device being shiftable relative to the knife between alternative positions covering and exposing the knife, said device being disposed to effect said pulling of the neck skin taut during shifting of the device toward said position exposing the knife.

3. Mechanism as claimed in claim 2; and structure for causing the device to shift into said position exposing the knife as the device pulls the neck skin taut.

4. Mechanism as claimed in claim 3, said knife and said device being mounted on a common movable support, said structure being disposed to engage and shift the device into said position exposing the knife during one portion of the cycle of movement of said support, said knife being disposed to slit the neck skin during another portion of the cycle of movement of said support.

5. Mechanism for preparing an access slit in the neck skin of a poultry carcass comprising:

a knife;

a device for engaging and pulling the neck skin taut on a poultry carcass prior to slitting;

means for operating the knife in a manner to slit the neck skin while it is pulled taut by the device, said device being shiftable relative to the knife between alternative positions covering and exposing the knife, said device being disposed to effect said pulling of the neck skin taut during shifting of the device toward said position exposing the knife;

structure for causing the device to shift into said position exposing the knife as the device pulls the neck skin taut, said knife and said device being mounted on a common movable support, said structure bing disposed to engage and shift the device into said position exposing the knife during one portion of the cycle of movement of said support, said knife being disposed to slit the neck skin during another portion of the cycle of movement of said support; and a spring operably coupled with said device for yieldably biasing the device toward said position covering the knife.

6. Mechanism for preparing an access slit in the neck skin of a poultry carcass comprising:

a knife;

a device for engaging and pulling the neck skin taut on a poultry carcass prior to slitting;

means for operating the knife in a manner to slit the neck skin while it is pulled taut by the device, said device and said knife being mounted on one end of a common support that is swingable in an operating direction to present the device and the knife to the neck of the carcass, said device being movable relative to the knife in a neck skin stretching motion; and structure for operating said device in said neck skin stretching motion in response to swinging of the support in said operating direction.

7. Mechanism as claimed in claim 6; and a holder for stabilizing the carcass during the slitting process, said structure including a cam surface associated with the holder and disposed for operating engagement with the device when the support is swung in said operating direction.

8. Mechanism as claimed in claim 7, said device being pivotally mounted on the support for pivoting movement relative to the knife during said neck skin stretching motion.

9. Mechanism as claimed in claim 8; and a spring operably coupled between the support and the device for yieldably biasing the device against movement in said neck skin stretching motion.

10. Mechanism as claimed in claim 9, said device having a tapered notch disposed to receive and center the neck of the carcass laterally when the device engages the neck, said knife being slightly offset laterally from an imaginary centerline of the notch.

11. Mechanism as claimed in claim 10, said notch having a pair of opposite, inwardly converging sides, each of said sides having a rough surface for promoting non-slip engagement with the neck skin of the carcass.

12. Mechanism for preparing an access slit in the neck skin of a poultry carcass comprising:

a knife;

a device for engaging and pulling the neck skin taut on a poultry carcass prior to slitting; and means for operating the knife in a manner to slit the neck skin while it is pulled taut by the device.

said device having a tapered notch disposed to receive and center the neck of the carcass laterally when the device engages the neck, said knife being slightly offset laterally from an imaginary centerline of the notch, said device being movable relative to the knife in a neck skin stretching motion upon receiving the neck of the carcass within said notch whereby to prepare the neck of the carcass for engagement by the knife.

13. Mechanism as claimed in claim 12, said device being disposed to cover the knife prior to movement of the device in said neck skin stretching motion and to expose the knife upon carrying out said stretching motion.

14. In a method of preparing an access slit in the neck skin along the breast side of the neck of a poultry carcass, the improvement comprising:

pulling the neck skin taut along the breast side of the neck with a pulling force; and while the neck skin is pulled taut, penetrating the neck skin along the breast side of the neck with a knife and moving the knife in a slitting stroke in a direction generally parallel to the pulling force while the knife is penetrating the neck skin.

15. In a method as claimed in claim 14, said pulling force being applied to the neck skin in a contacting motion along the neck.

16. In a method as claimed in claim 15, said pulling force being applied with a device having a tapered notch which receives the neck and moves away from the point of penetration of the knife into the neck skin while the confines of the notch contact the neck skin.

17. In a method of preparing an access slit in the neck skin of a poultry carcass, the improvement comprising:

pulling the neck skin taut with a pulling force, and while the neck skin is pulled taut, penetrating the neck skin with a knife and moving the knife in a slitting stroke in a direction generally parallel to the pulling force while the knife is penetrating the neck skin.

said pulling force being applied to the neck skin in a contacting motion along the neck, said pulling force being applied with a device having a tapered notch which receives the neck and moves away from the point of penetration of knife into the neck skin while the confines of the notch contact the neck skin.

said receiving of the neck into the tapered notch being effective to center the neck laterally within the notch, said knife being positioned slightly offset laterally from an imaginary centerline through the notch when the knife is penetrating and slitting the neck skin.

18. In a method as claimed in claim 14, said pulling force being applied with a device having a tapered notch which receives the neck and moves away from the point of penetration of the knife into the neck skin while the confines of the notch contact the neck skin.

19. In a method as claimed in claim 18, said pulling and moving steps being carried out while the carcass is being conveyed along a moving conveyor line.

20. In a method as claimed in claim 14, said pulling and moving steps being carried out while the carcass is being conveyed along a moving conveyor line.

21. In a machine for preparing an access slit in the neck skin of each carcass in a series of poultry carcasses suspended by their legs and moving in succession along an overhead conveying line, the improvement comprising:

a plurality of fixtures movable in spaced succession along a path of travel disposed to intersect the path of travel of the carcasses along the conveying line, each of said fixtures being disposed to travel in concert with one of the carcasses as the access slit is prepared in the carcass;

holding means associated with each fixture for retaining a carcass essentially stationary on the fixture with its breast facing outwardly while the access slit is being made, said holding means including a backstop positioned to lie behind and backup the neck of the carcass during the slitting operation;

a knife on each fixture, respectively, movable relative to the holding means in a path of travel disposed to cause the knife to penetrate the skin on the neck of the carcass and then shift through a slitting stroke while still penetrating the skin;

means for effecting said movement of the knife in said path of travel;

a neck skin stretcher associated with each knife, respectively, for pulling the neck skin of the carcass on the fixture taut before the knife penetrates and slits the skin, said stretcher being shiftable relative to the knife in a neck skin stretching motion while contacting the neck skin of the carcass on the fixture; and structure for operating the stretcher in said neck skin stretching motion.

22. In a machine as claimed in claim 21, said stretcher and said knife being mounted on a common support that is swingable in an operating direction to present the stretcher and the knife to the neck of the carcass, said structure including a cam surface on the fixture disposed for operating engagement with the stretcher when the support is swung in said operating direction.

23. In a machine as claimed in claim 22, said stretcher being pivotally mounted on the support for pivoting movement relative to the knife during said neck skin stretching motion.

24. In a machine as claimed in claim 23; and a spring operably coupled between the support and the stretcher for yieldably biasing the stretcher against movement in said neck skin stretching motion.

25. In a machine as claimed in claim 24, said stretcher having a tapered notch disposed to receive and center the neck of the carcass laterally when the stretcher engages the neck, said knife being slightly offset laterally from an imaginary centerline of the notch.

26. In a machine as claimed in claim 25, said notch having a pair of opposite, inwardly converging sides, each of said sides having a rough surface for promoting non-slip engagement with the neck skin of the carcass.

27. In a machine as claimed in claim 21, said stretcher having a tapered notch disposed to receive and center the neck of the carcass laterally when the stretcher engages the neck, said knife being slightly offset laterally from an imaginary centerline of the notch, said stretcher being movable relative to the knife in a neck skin stretching motion upon receiving the neck of the carcass within said notch whereby to prepare the neck of the carcass for engagement by the knife.

28. In a machine as claimed in claim 27, said stretcher being disposed to cover the knife prior to movement of the stretcher in said neck skin stretching motion and to expose the knife upon carrying out said stretching motion.

29. In a machine as claimed in claim 21; and a spring operably coupled with the stretcher for yieldably biasing the stretcher against said shifting in the neck skin stretching motion.

30. In a machine as claimed in claim 22, said stretcher and said knife being disposed at one end of said support, said machine further including a cam track adjacent the fixtures for causing said swinging of the support in said operating direction, said support having a cam follower at an opposite end of the support for engagement with said cam track.

31. In a machine as claimed in claim 21, said knife having a hook which serves as the working portion thereof, said hook having a sharp point for making the initial penetration into and through the neck skin, and an arcuate, generally concave cutting edge leading away from the point on the underside of the hook.

\* \* \* \* \*